Sept. 29, 1964   R. LAUMONT   3,150,599
HYDRAULIC POWER CONVERSION DEVICE
Filed March 28, 1962   2 Sheets-Sheet 2

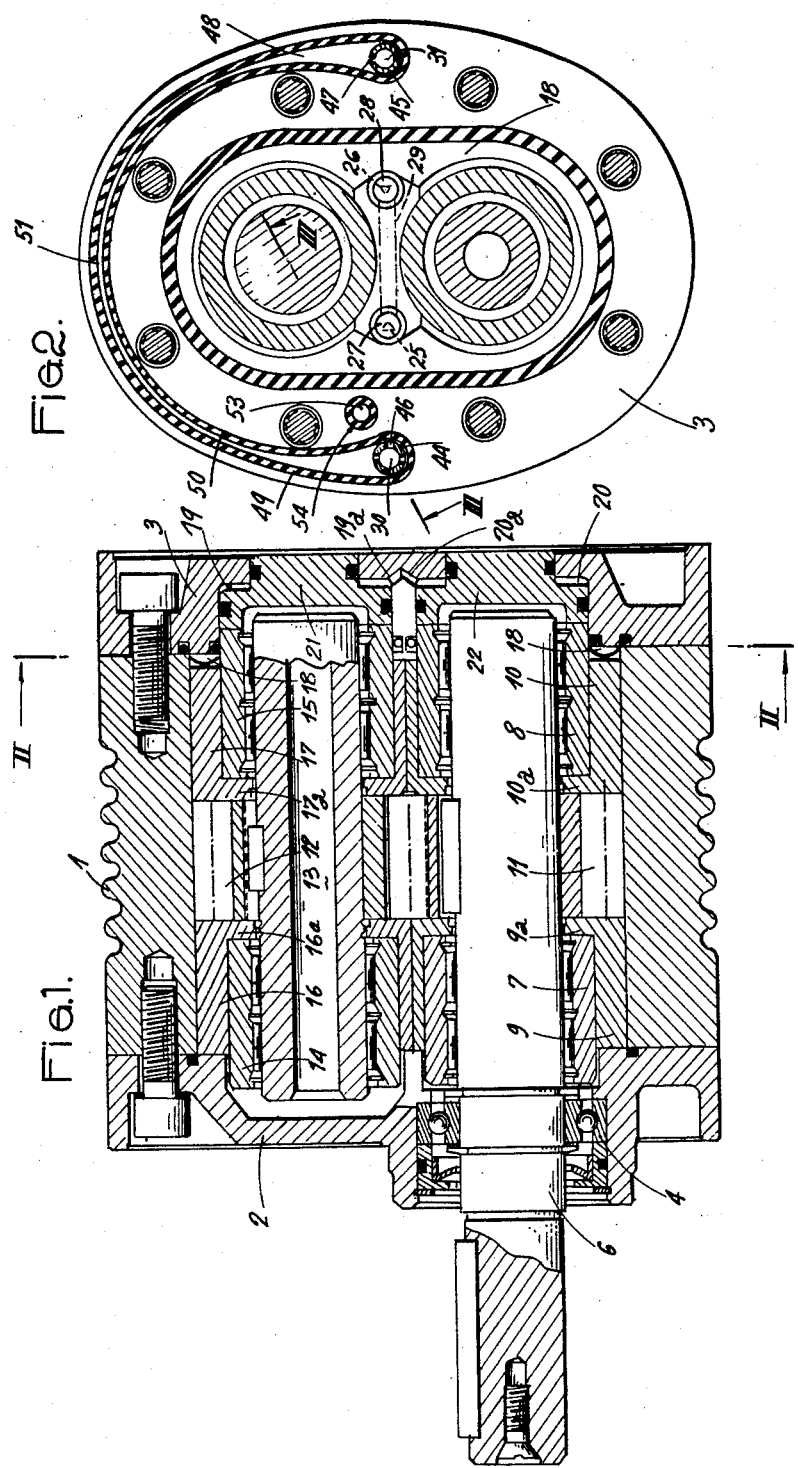

United States Patent Office 3,150,599
Patented Sept. 29, 1964

3,150,599
HYDRAULIC POWER CONVERSION DEVICE
Roger Laumont, Nogent-sur-Marne, Seine, France, assignor to Hydro-Meca, Paris, France, a company of France
Filed Mar. 28, 1962, Ser. No. 183,068
Claims priority, application France, Oct. 17, 1961, 876,229, Patent 1,311,129
2 Claims. (Cl. 103—126)

The present invention relates to improvements in a hydraulic power conversion device of the type forming the subject matter of U.S. application Serial No. 124,904, and in which there is provided at least one rotary element preferably of the meshing gear type whose lateral faces are held between two flat cheeks or bushings, one at least of these bushings being axially mobile and being subjected, on part of its surface, to the high pressure prevailing in the device, whereas another part of the surface of this cheek or bushing is subjected to the low pressure prevailing in said device, so that the pressure exerted by said cheek or bushing on the rotary element is an additive function of said two pressures: which are pressures taken in the inlet and outlet ducts or ports of said device and independent of the pressure prevailing inside the casing in which the rotary element is located.

The improvements according to the present invention are directed to a new structure allowing the inlet and outlet pressures to be applied properly against the movable cheek or bushing in both rotational directions of the rotary element and furthermore independent of whether or not the device is functioning as a hydraulic motor or as a hydraulic pump.

Another object of the invention is to provide such a device comprising a valve member which does not utilize any spring members and which is operated only by the difference in pressure between the inlet and outlet ports or collectors of the device.

A further object of the invention is to provide such an arrangement in which several of said devices can be mounted in series relation without any modification of structure.

Still another object of the invention resides in the fact that the pressure either in the inlet port or outlet port is not applied inside the casing of the device, so that the inside of the casing can be, as usual in the art, directly connected to the source of motive liquid.

Various other objects and advantages of the invention will moreover be revealed by the detailed description which follows.

One embodiment of the invention is shown, by way of a non-restrictive example in the attached drawing in which:

FIG. 1 is an axial longitudinal sectional view of one embodiment of the device according to the invention;

FIG. 2 is a section taken substantially along the line II—II of FIG. 1; and

Figure 3:
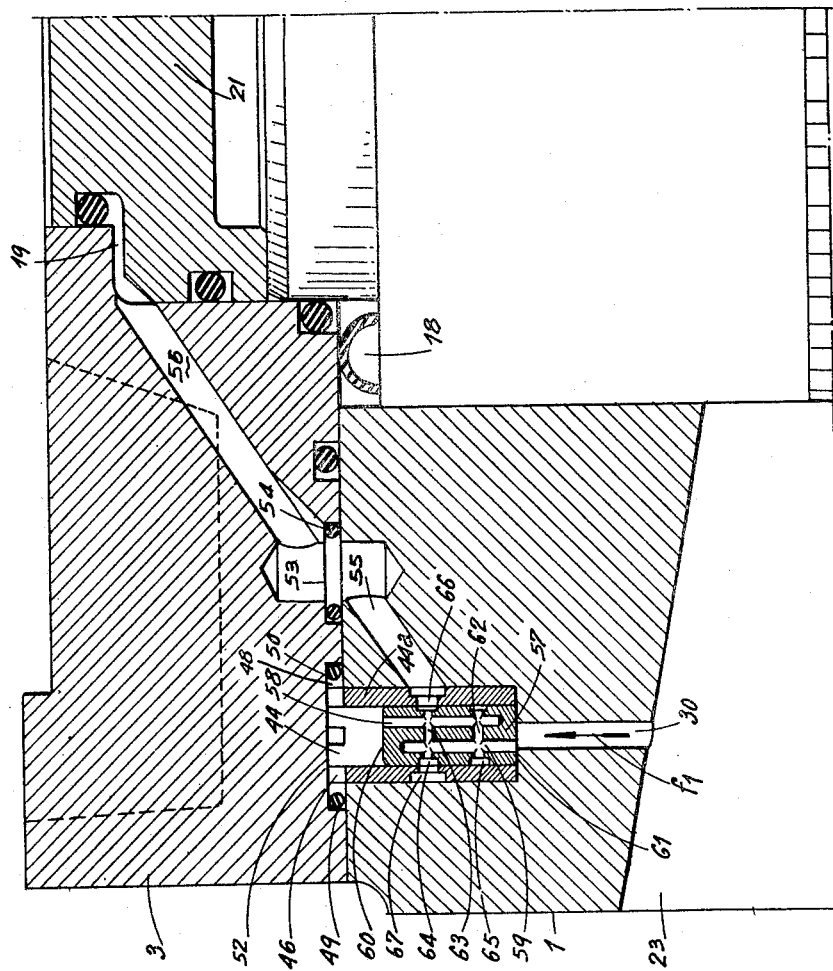
FIG. 3 is a partial section, on a larger scale, taken substantially along the line III—III of FIG. 2, and showing a detail.

As in said application Serial No. 124,904 the reversible hydraulic device of the present invention can operate either as a double rotary pump or as a motor. The device comprises a casing 1 closed at its ends by end plates or bells 2 and 3. End plate 2 supports a bearing 4 in which is mounted a shaft 6 which is additionally supported by anti-friction bearings 7 and 8 having a light frictional engagement in sleeves 9 and 10. These sleeves are mounted for axial sliding movement inside casing 1.

Sleeves 9 and 10 are formed with radially inwardly extending flanges forming bushings 9a and 10a which are arranged to engage the axially opposite ends of the pinion 11 keyed on shaft 6. Pinion 11 meshes with a second pinion 12 carried by a shaft 13 extending parallel to shaft 6. Shaft 13 is mounted, in the same manner as shaft 6, in antifriction bearings 14 and 15 which have a light frictional engagement in axially movable sleeves 16 and 17. Sleeves 16 and 17 are formed with radially inwardly extending flanges 16a and 17a forming bushings adapted to bear against the axially opposite ends of pinion 12.

Sleeves 9 and 16 are adapted to bear against end plate 2, whereas sleeves 10 and 17 are separated from end plate 3 by a chamber 18. End plate 3 is further formed with recesses defining cylinders 19 and 20 in which are engaged pistons 21 and 22. These pistons bear, respectively, against the outer races or cages of the bearings 8 and 15. In the following description, the chambers 19 and 20 are referred to as "secondary compensation chambers" and the chamber 18 is referred to as "principal compensation chambers."

For the purposes of the following description, it will be assumed that the device is intended to work as a motor and is driven, in the same manner as any hydraulic rotary motor, by a liquid under pressure admitted into an intake collector on port 23 (FIG. 3). The working liquid is discharged through a discharge collector or outlet port 24.

These intake and discharge ports communicate by ducts 25 and 26 with the principal compensation chamber 18 through the medium of two flap valves 27 and 28 (FIG. 2) which are interconnected by rocker arm 29 so that their opening and closing is controlled as a function of the differences between the inlet and outlet pressures. By this arrangement the higher pressure is always applied in the principal compensating chamber 18.

The inlet and outlet ports 23 and 24 also communicate with cross ducts 30 and 31 opening into the inner surface of end plate 3 (FIGS. 1 and 3).

Tubular members or sleeves 44 and 45 are inserted into the outlets of ducts 31 and 30 and project therebeyond into an arcuate or semi-annular chamber 48 defined by opposite sides of an inner sealing member 51 positioned in a groove 52 formed in the inner surface of end plate 3. The projecting portions of sleeves 44 and 45 are formed with ports 46 and 47 establishing communication between chamber 48 and the interior of sleeves 44 and 45.

As shown in FIG. 3, end plate 3 is formed with a recess 53 in which is seated an annular sealing washer 54. Recess 53 establishes communication between a duct 55, extending obliquely inside casing 1, and a duct 56, extending obliquely inside end plate 3. This series of ducts establishes communication between the secondary compensation chamber 19 and the sleeve 30. Secondary compensation chambers 19 and 20 are interconnected by passages 19a formed inside end plate 3.

Tubular member 44 has a sleeve portion 44a seated in duct 30, and sleeve portion 44a has a cylindrical slide movable therein with a light friction, and operating in the following manner.

Slide 57, which forms both a separating piston and a slide valve, has two blind bores 58 and 59 extending respectively from its opposite faces 60 and 61. Blind bores 58 and 59 are connected to cross bores 62 and 63, respectively, in slide 57 which place blind bores 58 and 59 in communication with circumferential grooves 65 and 64 respectively. In accordance with the particular position of slide 57, one or the other of the cross bores of 62 and 63 is in communication with port 66 which communicates with an annular groove 67 on the outer surface of sleeve 44a and communicating with the passage 55.

When the device is acting as a motor, as set forth above, duct 623 is the inlet port or duct and thus a higher pressure prevails therein. This higher pressure also prevails in bore 30 wherein it is effective against the end face of slide 57. In discharge collector or port 24, there is a lower pressure which also prevails in bore 31. This lower pressure is thus effective in the ports 47 of the tubular member 45. The low pressure is thus applied to chamber 48 and, through ports 46 of tubular member 44, to the upper end face of slide 57. The resulting pressure differential has the effect of moving slide 57 in the direction of arrow f', and thus to place cross bore 62 in communication with circumferential groove 67. The low pressure is thus applied to ducts 55 and 56 to secondary compensating chambers 19 and 20 and acts against the inner surface of pistons 21. The higher pressure in chamber 18 is effective against the ends of sleeves 10 and 17.

When the device works in the other rotational direction, the pressures prevailing in the collectors or ports are reversed or inverted. The slide 57 is thus subjected to a resultant pressure which has the effect of moving it in the opposite direction to that of the arrow f'. Slide 57 is thus moved to establish communication between cross bore 63 and annular grooves 67. This displacement has the effect of again transmitting a low pressure to the secondary compensation chambers 19 and 20.

Thus, whatever the method of operation and direction of rotation device, the lower pressure is always applied in the chambers 19 and 20 so as to exert, on the rotary elements, a secondary compensation through the bearings and the slider beam mounted cages for the antifriction bearings.

I claim:

1. A reversible hydraulic device comprising, in combination, a hollow casing having a pair of end walls; first and second bushings in said casing in co-axial alignment and in axially spaced relation; bearing means mounted in said bushings; a shaft rotatably mounted in said bearing means and projecting through one end wall of said casing; a rotor secured to said shaft within said casing and between said bushings; said bushings having radial flanges on their inner ends between and in contact with the end faces of said rotor and with the inner ends of the respective bearing means; one of said bushings being slidable axially of said shaft and the other engaging an end wall of said casing; means including the axially outer end of said one bushing, said casing, and the other casing end wall defining a first pressure chamber; said flanges and said casing defining a sealed working cavity for said rotor; means forming a pressure fluid inlet port and a pressure fluid outlet port, said inlet and outlet ports being interchangeable as to function in accordance with the direction of rotation of said rotor and the pressure in one port exceeding the pressure in the other port; a first pressure sensitive valve assembly connected to both ports and to said first pressure chamber and operable automatically to connect said first chamber to the port then at the higher pressure to apply the higher pressure to the outer end of said one bushing to force the flange thereof into sealing engagement with the corresponding end of said rotor; a piston engaging the outer end of the bearing in said one bushing; means including such other casing end wall and the outer face of said piston defining a second pressure chamber; and a second pressure sensitive valve assembly connected to both ports and to said second chamber and operable automatically to connect said second chamber to the port then at the lower pressure to apply the lower pressure to the outer face of said piston to force the bearing engaged thereby into sealing engagement with the flange of said one bushing to augment the higher pressure in forcing said one bushing into sealing engagement with said rotor; said second pressure sensitive valve assembly comprising a valve sleeve in said casing having an aperture in communication with said second chamber; a slide valve freely reciprocable in said sleeve; means operable to apply the pressures at said fluid inlet port and said fluid outlet port to respective opposite ends of said slide valve to move the latter between either of two positions dependent upon which of said port pressures is higher, the movement of said slide valve being effected solely by said port pressures; said valve having a pair of oppositely directed blind passages longitudinally thereof opening to respective ends thereof and connected to respective longitudinally spaced blind cross-passages each alignable with said sleeve aperture in a respect of one of said two positions of said slide valve; the blind passage subjected to the then lower pressure being in communication with said sleeve aperture in each position.

2. A reversible hydraulic device, as claimed in claim 1, including a recess in said casing opening toward said one end wall and connected to a passage in communication with one of said fluid inlet and fluid outlet ports; a semi-annular chamber in the surface of said one end wall facing said casing and communicating at one end with the other of said fluid inlet and fluid outlet ports; said valve sleeve being mounted in said recess and having an end portion projecting into said semi-annular chamber; said end portion being ported to establish communication between the interior of said valve sleeve and said semi-annular chamber.

References Cited in the file of this patent
UNITED STATES PATENTS

| | | |
|---|---|---|
| 1,780,109 | Berglund | Oct. 28, 1930 |
| 2,420,622 | Roth et al. | May 13, 1947 |
| 2,444,165 | Lauck | June 29, 1948 |
| 2,627,232 | Lauck | Feb. 3, 1953 |
| 2,772,638 | Nagely | Dec. 4, 1956 |
| 2,782,724 | Humphreys | Feb. 26, 1957 |
| 2,842,066 | Hilton | July 8, 1958 |
| 2,855,856 | Murray et al. | Oct. 14, 1958 |
| 2,974,605 | Murray | Mar. 14, 1961 |
| 3,051,091 | Bennett et al. | Aug. 28, 1962 |

FOREIGN PATENTS

| | | |
|---|---|---|
| 1,142,537 | France | Apr. 1, 1957 |